United States Patent
Chen et al.

(10) Patent No.: US 12,156,097 B2
(45) Date of Patent: Nov. 26, 2024

(54) SYSTEM AND METHOD OF RESILIENT ULTRA WIDE BAND TARGET LOCALIZATION FOR A VEHICLE

(71) Applicant: GM Global Technology Operations LLC, Detroit, MI (US)

(72) Inventors: Jinzhu Chen, Troy, MI (US); Zijun Han, Rochester Hills, MI (US); Aaron Adler, Rochester Hills, MI (US); John Sergakis, Bloomfield Hills, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 189 days.

(21) Appl. No.: 18/049,891

(22) Filed: Oct. 26, 2022

(65) Prior Publication Data

US 2024/0171939 A1    May 23, 2024

(51) Int. Cl.
*H04W 4/40* (2018.01)
*H04W 4/02* (2018.01)
*H04W 64/00* (2009.01)

(52) U.S. Cl.
CPC ............ *H04W 4/027* (2013.01); *H04W 4/40* (2018.02); *H04W 64/006* (2013.01)

(58) Field of Classification Search
None
See application file for complete search history.

(56) References Cited

U.S. PATENT DOCUMENTS

| | | | |
|---|---|---|---|
| 2022/0001836 A1* | 1/2022 | Baek | G01S 13/878 |
| 2022/0055654 A1* | 2/2022 | Luan | G01S 5/0284 |
| 2022/0292973 A1* | 9/2022 | Orlando | B66F 9/0755 |
| 2024/0171944 A1* | 5/2024 | Hollar | H01M 10/46 |

\* cited by examiner

*Primary Examiner* — John F Mortell
(74) *Attorney, Agent, or Firm* — Vivacqua Crane, PLLC

(57) ABSTRACT

A method and system of resilient UWB target localization for a vehicle are provided. The system comprises a UWB tag arranged to be mobile and trackable by way of a sensor signal and at least three UWB anchors. Each anchor is in communication with the tag. The system further comprises a gateway in communication with the anchors. The gateway comprises an ECU arranged to receive sensor signals from UWB anchors. The ECU comprises a preprocessing module, a clustering module, and a Bayesian module. The preprocessing module is arranged to align sensor signals at an aligned timestamp to define aligned data. The clustering module is arranged to cluster points of intersections, defining a sensed location for each cluster. The Bayesian module is arranged to determine a real-time location of the tag based on a Bayesian probability function to match the sensed location with a predicted location of the tag.

20 Claims, 1 Drawing Sheet

SYSTEM AND METHOD OF RESILIENT ULTRA WIDE BAND TARGET LOCALIZATION FOR A VEHICLE

INTRODUCTION

The present disclosure relates to systems and methods of wireless localization of targets and, more particularly, systems and methods of resilient ultra wide band (UWB) localization of mobile targets with uncertain noises for a vehicle.

Wireless localization of mobile targets can be achieved for outdoor environments. However, accuracies may vary for a number of wireless technologies or networks such as Wi-Fi or Bluetooth Low Energy. More specifically, there are inaccuracy issues due to signal reflections, signal absorption, and sensor error causing uncertain noise in outdoor environments.

SUMMARY

Thus, while current wireless systems and methods achieve their intended purpose, there is a need for a new and improved system and method for resilient ultra wide band (UWB) target localization for a vehicle.

In accordance with one aspect of the present disclosure, a method of resilient ultra wide band (UWB) target localization for a vehicle is provided. The method comprises receiving sensor signals from at least three UWB anchors and a UWB tag for a time period. The sensor signals represent anchor coordinates and real-time distances between the tag and each anchor.

The method further comprises aligning the sensor signals at an aligned timestamp during the time period by way of:

$$\overline{t_{s_i} + \frac{k}{f_i}} = t_i \text{ when } t_{i-1} \le t_{s_i} + \frac{k}{f_i} < t_i,$$

where $t_{s_i}$ is an initial timestamp of the time period, k is a number of timestamps of the time period, $f_i$ is a fixed data uploading frequency, $t_i$ is the aligned timestamp, and $t_{s_i}+k/f_i$ is at an upper limit thereof to define aligned data.

In this aspect, the method further comprises determining intersections of the aligned data based on anchor coordinates and the real-time distances by way of:

$$N_p = \sum_{k=0}^{k=C_N^2} NoI_k,$$

where $N_p$ is total number of intersections, k is an iteration, $C_N^2 = N*(N-1)/2$ is an overall number of groups among N circles, and $N_o I_k$ is a number of intersections between a pair of non-concentric circles of the aligned data to define points of intersections.

Moreover, the method further comprises clustering the points of intersections by way of:

$$\epsilon = P * \frac{\sum_{i=1}^{n}(\hat{R}_i)}{n} \text{ and}$$

$$\text{Min}(P) = m^2 + 1,$$

where $\epsilon$ is the distance threshold between each point, P is a distance ratio threshold, n is a number of sensors, and $\hat{R}_i$ is an average distance value of the aligned data from the UWB anchors, Min(P) is the minimum points threshold, and m is a number of signals from the UWB anchors to define at least one cluster of points of the UWB anchors.

Additionally, the method further comprises determining a geometric center of the at least one cluster by way of:

$$o_c = \frac{\sum_{i=1}^{n} p_i}{n},$$

where $o_c$ is the geometric center of the at least one cluster, $p_i$ is a point of the at least one cluster, and n is a number of intersections of the at least one cluster to define a sensed location of the tag for each cluster.

Furthermore, the method further comprises determining a real-time location of the tag based on a Bayesian probability function to match the sensed location with a predicted location of the tag by way of:

$$L_t = p * f_{bay}(L_t^s, L_t^p) + (1-p) * L_t^p,$$

$$L_t^p = fmov\ (L_{t-1}, v, \theta), \text{ and}$$

$$p = \rho * \left(1 - \frac{\arctan(\delta)}{\pi/2}\right),$$

where $L_t$ is the real-time location at timestamp t, p is a normalized location parameter, $f_{bay}$ is the Bayesian probability function, $L_t^s$ is the sensed location for each cluster at timestamp t, $L_t^p$ is the predicted location, $f_{mov}$ is a moving function for the motion-based predicted location, v is tag moving speed, $\theta$ is tag moving direction, $\rho$ is cluster quality of the at least one cluster, and $\delta$ is cluster variance of the at least one cluster.

In one example, the step of determining intersections of the aligned data comprises determining a pair of circles defined by the aligned data of the anchors. Each circle has coordinates with respect to a current distance $r_i^j$ from the tag defined by:

$cir_i^j$: $(X-x_i)^2+(Y-y_i)^2=(r_i^j)^2$, each anchor having coordinates defined by:

$C_i=(x_i, y_i)$, the aligned data being denoted as:
$R_i=r_i^1, r_i^2, \ldots r_i^{mi}$, where $cir_i^j$ is a circle of an anchor i for an aligned signal j, X is a coordinate of the circle on an x-axis, $x_i$ is a coordinate of the center of the circle on the x-axis, Y is a coordinate of the circle on the y-axis, and $y_i$ is a coordinate of the center of the circle on the y-axis, $R_i$ is a sequence of ranging signals from each anchor, $r_i^j$ is the $j^{th}$ signal of the aligned data of the anchors and representing the current distance.

The step of determining intersections of the aligned data further comprises determining a distance between the pair of circles with:

$$D_{<O_i,O_{i'}>}=\sqrt{(x_i-x_{i'})^2+(y_i-y_{i'})^2},$$

where D is an Jzhqijfs% distance between the pair of circles $O_i$ and $O_i'$ and determining a number of intersections between the pair of circles with:

$$NoI_{\langle O_i^j, O_{i'}^{j'}\rangle} \begin{cases} 0 & D_{\langle O_i^j, O_{i'}^{j'}\rangle} > r_i^j + r_{i'}^{j'} \\ 1 & D_{\langle O_i^j, O_{i'}^{j'}\rangle} = r_i^j + r_{i'}^{j'} \\ 2 & D_{\langle O_i^j, O_{i'}^{j'}\rangle} < r_i^j + r_{i'}^{j'} \end{cases},$$

where NoI is a number of intersections between the pair of circles.

In another example, the step of determining intersections of the aligned data further comprises determining intersection coordinates of the pair of circles with:
$I^+_{<i,i+1>}=(x+,y+)$ and $I^-_{<i,i+1>}=(x-,y-)$, where $I^+_{<i,i+1>}$ and $I^-_{<i,i+1>}$ are two symmetrical intersections coordinate of two circle $O_i^j$ and $O_i^{j'}$.

In yet another example, the step of determining intersection coordinates of the pair of circles is by way of:

$$x += x_i + \frac{a(x_{i+1} - x_i)}{D_{\langle O_i, O_{i+1}\rangle}} + h * \frac{(y_{i+1} - y_i)}{D_{\langle O_i, O_{i+1}\rangle}},$$

$$y += y_i + \frac{a(y_{i+1} - y_i)}{D_{\langle O_i, O_{i+1}\rangle}} - h * \frac{(x_{i+1} - x_i)}{D_{\langle O_i, O_{i+1}\rangle}},$$

$$x -= x_i + \frac{a(x_{i+1} - x_i)}{D_{\langle O_i, O_{i+1}\rangle}} - h * \frac{(y_{i+1} - y_i)}{D_{\langle O_i, O_{i+1}\rangle}}, \text{ and}$$

$$y -= y_i + \frac{a(y_{i+1} - y_i)}{D_{\langle O_i, O_{i+1}\rangle}} + h * \frac{(x_{i+1} - x_i)}{D_{\langle O_i, O_{i+1}\rangle}},$$

where a and h are given by:

$$a = \frac{(r_i^j)^2 - (r_{i+1}^j)^2}{2D_{\langle O_i, O_{i+1}\rangle}} \text{ and } h = \sqrt{(r_{i+1}^j)^2 - a^2},$$

respectively.

In still another example of this aspect, the step of clustering the points of intersections comprises calculating a clustering quality and a clustering variance of each of the at least one cluster by way of:

$$\rho = \frac{1}{e^{|N_c - \frac{N_p}{2}|}} \text{ and } \delta = \sqrt{\frac{\sum_{i=0}^n p_i - o_c}{n}},$$

where $\rho$ is the clustering quality, e is error between a number of points in the at least one cluster, $N_c$ is a number of points in the at least one cluster, $\delta$ is the clustering variance, $p_i$ is points of the at least one cluster, $o_c$ is a geometric center of each cluster.

In another example, the step of determining the real-time location of the tag comprises calculating a sensed probability of each sensed location for each cluster by way of:

$$P_t^{s_i} = \frac{N_{c_i}}{\sum_{j=1}^s (N_{c_j})},$$

where $P_t^{S_i}$ is the sensed probability, $N_{c_i}$ is a number of points in one of the clusters, and $N_{c_j}$ is a point in the one of the clusters.

In yet another example, the step of determining the real-time location of the tag further comprises comparing each sensed location with a predicted location of the tag to identify error by way of:

$$E = \sum_{j=1}^n (e_t^{s_j}),$$

where the predicted location is based on the aligned data of the UWB anchors, the E is total error for each cluster and $e_t^{sj}$ is error between the sensed location $L_t^s$ and the predicted location $L_t^p$.

In still another example of this aspect, the step of determining the real-time location of the tag further comprises ranking each sensed location based on one of highest sensed probability and least amount of error between the sensed location and the predicted location to define a real-time location of the tag In accordance with another aspect of the present disclosure, a system of resilient UWB target localization for a vehicle is provided. The system comprises a UWB tag arranged to be mobile and trackable by way of a sensor signal and at least three UWB anchors. Each UWB anchor is in communication with the UWB tag and arranged to receive and send the sensor signal for tracking the UWB tag.

The system further comprises a gateway in communication with the UWB anchor. The gateway comprises an electronic control unit (ECU) arranged to receive sensor signals from the UWB anchors for a time period. the sensor signals represent anchor coordinates and real-time distances between the tag and each anchor.

In this aspect, the ECU comprises a preprocessing module arranged to align the sensor signals at an aligned timestamp during the time period by way of:

$$\overline{t_{s_i} + \frac{k}{f_i}} = t_i \text{ when } t_{i-1} \le t_{s_i} + \frac{k}{f_i} < t_i,$$

where $t_{si}$ is an initial timestamp of the time period, k is a number of timestamps of the time period, $f_i$ is a fixed data uploading frequency, $t_i$ is the aligned timestamp, $t_{si}+k/f_i$ is at an upper limit thereof to define aligned data.

In this aspect, the preprocessing module is arranged to determine intersections of the aligned data based on the tag and anchor coordinates and the real-time distances by way of:

$$N_p = \sum_{k=0}^{k=C_N^2} NoI_k,$$

where $N_p$ is total number of intersections, k is an iteration, $C_N^2=N*(N-1)/2$ is an overall number of groups among N circles, and $NoI_k$ is a number of intersections between a pair of non-concentric circles of the aligned data to define points of intersections.

The ECU further comprises a clustering module arranged to cluster the points of intersections by way of:

$$\epsilon = P * \frac{\sum_{i=1}^n (\hat{R}_i)}{n} \text{ and } \text{Min}(P) = m^2 + 1,$$

where ϵ is the distance threshold between each point, P is a distance ratio threshold, n is a number of sensors, and $R_i^\wedge$ is an average distance value of the aligned data from the UWB anchors, Min(P) is the minimum points threshold, and m is a number of signals from the UWB anchors to define at least one cluster of points of the UWB anchors. In this aspect, the clustering module is further arranged to determine a geometric center of the at least one cluster by way of:

$$o_c = \frac{\sum_{i=0}^n p_i}{n},$$

where $o_c$ is the geometric center of the at least one cluster, $p_i$ is a point of the at least one cluster, and n is a number of intersections of the at least one cluster to define a sensed location of the tag for each cluster.

The ECU further comprises a Bayesian module arranged to determine a real-time location of the tag based on a Bayesian probability function to match the sensed location with a predicted location of the tag by way of:

$$L_t = p*(f_c(L_t^S)) + (1-p)*f_{mov}(L_{t-1}, v, \theta)$$

and $$p = \rho * \left(1 - \frac{\arctan(\delta)}{\pi/2}\right),$$

where $L_t$ is the real-time location at timestamp t, p is a normalized location parameter, $f_{bay}$ is the Bayesian probability function, $L_t^s$ is the sensed location for each cluster at timestamp t, $L_t^p$ is the predicted location, v is tag moving speed, θ is tag moving direction, ρ is cluster quality of the at least one cluster, and δ is cluster variance of the at least one cluster.

In one embodiment, the preprocessing module is arranged to determine intersections of the aligned data wherein the preprocessing module is arranged to determine a pair of circles defined by the aligned data of the anchors. Each circle has coordinates with respect to a current distance $r_i^j$ from the tag defined by:

$cir_i^j$: $(X-x_i)^2+(Y-y_i)^2=(r_i^j)^2$. Each anchor has coordinates defined by:

$C_i=(x_i, y_i)$. The aligned data is denoted as:

$R_i=r_i^1, r_i^2, \ldots r_i^{mi}$, where $cir_i^j$ is a circle of an anchor i for an aligned signal j, X is a coordinate of the circle on an x-axis, $x_i$ is a coordinate of the center of the circle on the x-axis, Y is a coordinate of the circle on the y-axis, and $y_i$ is a coordinate of the center of the circle on the y-axis, $R_i$ is a sequence of ranging signals from each anchor, $r_i^j$ is the $j^{th}$ signal of the aligned data of the anchors and representing the current distance.

In this embodiment, the preprocessing module is arranged to determine a distance between the pair of circles with:

$D_{<O_i,O_{i'}>}=\sqrt{(x_i-x_{i'})^2+(y_i-y_{i'})^2}$, where D is a distance between the pair of circles $O_i$ and $O_i'$. Moreover, the preprocessing module is arranged to determine a number of intersections between the pair of circles with:

$$NoI_{<O_i^j, O_{i'}^{j'}>} = \begin{cases} 0 & D_{<O_i,O_{i'}>} > r_i^j + r_{i'}^{j'} \\ 1 & D_{<O_i,O_{i'}>} = r_i^j + r_{i'}^{j'} \\ 2 & D_{<O_i,O_{i'}>} < r_i^j + r_{i'}^{j'} \end{cases},$$

where NoI is a number of intersections between the pair of circles.

In another embodiment, the preprocessing module is arranged to determine intersections of the aligned data wherein the preprocessing module is arranged to determine intersection coordinates of the pair of circles with:

$I^+_{<i,i+1>}$=(x+,y+) and $I^-_{<i,i+1>}$=(x−,y−), where $I^+_{<i,i+1>}$ and $I^-_{<i,i+1>}$ are two symmetrical intersections coordinate of two circle $O_i^j$ and $O_i^{j'}$.

In yet another embodiment, the preprocessing module is arranged to determine intersection coordinates of the pair of circles is by way of:

$$x += x_i + \frac{a(x_{i+1} - x_i)}{D_{<O_i,O_{i+1}>}} + h * \frac{(y_{i+1} - y_i)}{D_{<O_i,O_{i+1}>}},$$

$$y += y_i + \frac{a(y_{i+1} - y_i)}{D_{<O_i,O_{i+1}>}} - h * \frac{(x_{i+1} - x_i)}{D_{<O_i,O_{i+1}>}},$$

$$x -= x_i + \frac{a(x_{i+1} - x_i)}{D_{<O_i,O_{i+1}>}} - h * \frac{(y_{i+1} - y_i)}{D_{<O_i,O_{i+1}>}}, \text{ and}$$

$$y -= y_i + \frac{a(y_{i+1} - y_i)}{D_{<O_i,O_{i+1}>}} + h * \frac{(x_{i+1} - x_i)}{D_{<O_i,O_{i+1}>}},$$

where a and h are given by:

$$a = \frac{(r_i^j)^2 - (r_{i+1}^j)^2}{2D_{<O_i,O_{i+1}>}} \text{ and } h = \sqrt{(r_{i+1}^j)^2 - a^2},$$

respectively.

In still another embodiment, the clustering module is arranged to cluster the points of intersections wherein the clustering module is arranged to calculate a clustering quality and a clustering variance of each of the at least one cluster by way of:

$$\rho = \frac{1}{e^{|N_c - \frac{N_p}{2}|}} \text{ and } \delta = \sqrt{\frac{\sum_{i=0}^n p_i - o_c}{n}},$$

where ρ is the clustering quality, e is error between a number of points in the at least one cluster, $N_c$ is a number of points in the at least one cluster, δ is the clustering variance, $p_i$ is points of the at least one cluster, $o_c$ is a geometric center of each cluster.

In another embodiment, the Bayesian module is arranged to determine the real-time location of the tag wherein the Bayesian module is arranged to calculate a sensed probability of each sensed location for each cluster by way of:

$$P_t^{S_i} = \frac{N_{c_i}}{\sum_{j=1}^S (N_{c_j})},$$

where $P_t^{S_i}$ is the sensed probability, $N_{ci}$ is a number of points in one of the clusters, and $N_{cj}$ is a point in the one of the clusters.

In yet another embodiment, the Bayesian module is arranged to determine the real-time location of the tag wherein the Bayesian module is arranged to compare each sensed location with a predicted location of the tag to identify error by way of:

$$E = \sum_{j=1}^{n}\left(e_t^{s_j}\right),$$

where the predicted location is based on the aligned data of the UWB anchors, the E is total error for each cluster and $e_t^{s_j}$ is error between the sensed location $L_t^s$ and the predicted location $L_t^p$.

In still another embodiment, the Bayesian module is arranged to determine the real-time location of the tag wherein the Bayesian module is arranged to rank each sensed location based on least amount of error between the sensed location and the predicted location to define the real-time location of the tag.

In yet another aspect of the present disclosure, a method of locating an ultrawide band (UWB) tag for a vehicle is provided. The method comprises receiving sensor signals from at least three UWB anchors for a time period. The sensor signals represent anchor coordinates and real-time distances between the tag and each anchor. The method further comprises aligning the sensor signals at an aligned timestamp during the time period to define aligned data.

The method further comprises determining intersections of the aligned data based on the anchor coordinates and the real-time distances to define points of intersections.

In this aspect, the method further comprises clustering the points of intersections to define at least one cluster of points of the UWB anchors.

The method further comprises determining a geometric center of the at least one cluster to define a sensed location of the tag for each cluster. Moreover, the method further comprises calculating a sensed probability of each sensed location for each cluster with a Bayesian probability function.

Additionally, the method comprises comparing each sensed location with a predicted location of the tag to identify error.

Furthermore, the method comprises ranking each sensed location based on one of highest sensed probability and least amount of error between the sensed location and the predicted location to define a real-time location of the tag In one example, the real-time location of the tag is based on the Bayesian probability function to compare the sensed location with the predicted location of the tag.

In another example, the step of clustering the points of intersections comprises calculating a clustering quality and a clustering variance of each of the at least one cluster.

In yet another example, the sensed probability is updated based on ranking each sensed location based on least amount of error between the sensed location and the predicted location.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Embodiments of the present disclosure are systems and methods for ultra wide band (UWB) target localization for a vehicle. The systems and methods described herein improve UWB technology related to mobile target localization accuracy under uncertain noise in an outdoor environment. Such uncertain noise may include signal block, signal reflection, signal absorption, and sensor error. The systems and methods of the present disclosure minimize or exclude noise data caused by the outdoor environment when determining a real-time location of a UWB tag, thereby improving localization accuracy of UWB technology.

Figure 1:
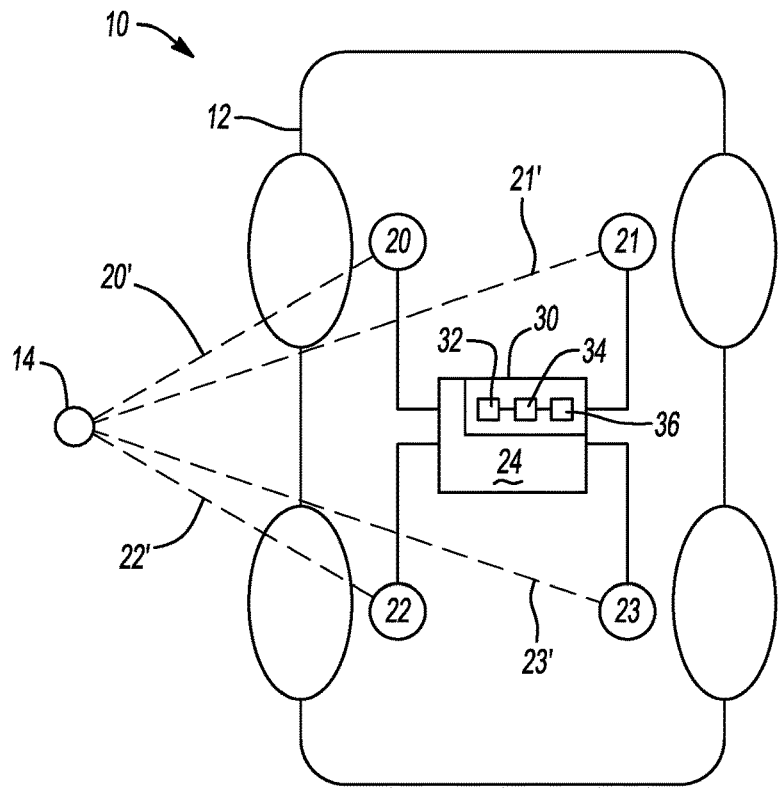
FIG. 1 is a schematic view of a system for resilient ultra wide band (UWB) target localization for a vehicle in accordance with one embodiment of the present disclosure.

FIG. 1 illustrates a system 10 for resilient ultra wide band (UWB) target localization for a vehicle 12 in accordance with one embodiment of the present disclosure. It is to be understood that the system 10 uses a short-range wireless communication protocol UWB having a range of frequency from about 3.1 GHz to about 10.5 GHz. Moreover, the system 10 has UWB sensors which may operate in two modes, namely anchor and tag. As shown, the system 10 comprises a mobile UWB tag 14 arranged to be trackable by at least three UWB anchors via a sensor signal, preferably a plurality of sensor signals. In this embodiment, the system 10 has four anchors 20-23 mounted on or fixed to the vehicle 12. Moreover, the UWB tag 14 is a mobile sensor and is moveably remote from the vehicle 12. The UWB tag 14 is arranged to receive and send sensor signals 20'-23' for tracking the UWB tag 14. Moreover, each UWB anchor is in communication with the UWB tag 14, and arranged to receive and send sensor signals 20'-23' for data and tracking of the UWB tag 14. In this example, each pair of sensors (anchor and tag) communicate by way of a sender-receiver model. Hence, a simple distance measurement strategy may be implemented. In this example, the tag initializes a two-way-ranging (TWR) by sending a poll message signal to the anchor. Next, the anchor records the time of reception and sends a response message signals to the tag. Using a time of flight (ToF) approach, the tag receives the response message and determines the ToF based on an overall time span $T_{loop}$ and a processing time span $T_{reply}$ as follows:

$ToF=(T_{loop}-T_{reply})/2$. In turn, an estimated distance of the tag may be calculated by multiplying ToF to the speed of light by way of:

Estimated distance=ToF×(3×10$^8$ m/s).

The system 10 further comprises a gateway 24 in communication with the UWB anchors 20-23 and UWB tag 14. Moreover, the gateway 24 is arranged to be communicable with a cloud server (not shown) as desired. The gateway 24 comprises an electronic control unit (ECU) or processor 30 arranged to receive and send sensor signals 20'-23' to and from the UWB anchors 20-23 and UWB tag 14 for a time period. In this embodiment, the sensor signals 20'-23' comprise or represent anchor coordinates and real-time distances between the tag and each anchor.

It is to be understood that the ECU 30 comprises software and a number of modules arranged to run algorithms to calculate, compute, and determine values to assist in the operation of the system 10 as discussed in greater detail below. In this embodiment, the ECU 30 comprises a preprocessing module 32 arranged to align the sensor signals 20'-23' at an aligned timestamp during the time period by way of:

$$t_{s_i} + \frac{k}{f_i} = t_i \text{ when } t_{i-1} \leq t_{s_i} + \frac{k}{f_i} < t_i.$$

As shown, $t_{si}$ is an initial timestamp of the time period, k is a number of timestamps of the time period, $f_i$ is a fixed data uploading frequency, $t_i$ is the aligned timestamp, and $t_{si}+k/f_i$ is at an upper limit thereof to define aligned data.

Moreover, the preprocessing module 32 is arranged to determine intersections of the aligned data based on the anchor coordinates and the real-time distances by way of:

$$N_p = \sum_{k=0}^{k=C_N^2} NoI_k.$$

As provided, $N_p$ is total number of intersections, k is an iteration, $C_N^2=N*(N-1)/2$ is an overall number of groups among N circles, and $NoI_k$ is a number of intersections between a pair of non-concentric circles of the aligned data to define points of intersections.

To compute the total number of intersections $N_p$, the preprocessing module 32 is arranged to determine a pair of circles defined by the aligned data of the anchors. Each circle has coordinates with respect to a current distance $r_i^j$ from the tag defined by:

$cir_i^j$: $(X-x_i)^2+(Y-y_i)^2=(r_i^j)^2$. It is understood that each anchor has coordinates defined by: $C_i=(x_i, y_i)$ and the aligned data is denoted as: $R_i=r_i^1, r_i^2, \ldots r_i^{mi}$. As shown, $cir_i^j$ is a circle of an anchor i for an aligned signal j, X is a coordinate of the circle on an x-axis, $x_i$ is a coordinate of the center of the circle on the x-axis, Y is a coordinate of the circle on the y-axis, and $y_i$ is a coordinate of the center of the circle on the y-axis, $R_i$ is a sequence of ranging signals from each anchor, and $r_i^j$ is the $j^{th}$ signal of the aligned data of the anchors and representing the current distance.

Moreover, the preprocessing module 32 is arranged to determine a distance between the pair of circles with:

$D_{<O_i,O_{i'}>}=\sqrt{(x_i-x_{i'})^2+(y_i-y_{i'})^2}$. As shown, D is a distance between the pair of circles $O_i$ and $O_i'$. In addition, the preprocessing module 32 is arranged to determine a number of intersections between the pair of circles with:

$$NoI_{<O_i^j,O_{i'}^{j'}>} = \begin{cases} 0 & D_{<O_i,O_{i'}>} > r_i^j + r_{i'}^{j'} \\ 1 & D_{<O_i,O_{i'}>} = r_i^j + r_{i'}^{j'} \\ 2 & D_{<O_i,O_{i'}>} < r_i^j + r_{i'}^{j'} \end{cases}$$

where NoI is a number of intersections between the pair of circles.

To further determine intersections of the aligned data, the preprocessing module 32 is arranged to determine intersection coordinates of the pair of circles with: $P^+_{<i,i+1>}=(x+,y+)$ and $P^-_{<i,i+1>}=(x-,y-)$. It is understood that $P^+_{<i,i+1>}$ and $P^-_{<i,i+1>}$ are two symmetrical intersections coordinate of circle $O_i^j$ and circle $O_i^{j'}$. More specifically, the preprocessing module 32 is arranged to determine intersection coordinates of the pair of circles is by way of:

$$x+=x_i+\frac{a(x_{i+1}-x_i)}{D_{<O_i,O_{i+1}>}}+h*\frac{(y_{i+1}-y_i)}{D_{<O_i,O_{i+1}>}},$$

$$y+=y_i+\frac{a(y_{i+1}-y_i)}{D_{<O_i,O_{i+1}>}}-h*\frac{(x_{i+1}-x_i)}{D_{<O_i,O_{i+1}>}},$$

$$x-=x_i+\frac{a(x_{i+1}-x_i)}{D_{<O_i,O_{i+1}>}}+h*\frac{(y_{i+1}-y_i)}{D_{<O_i,O_{i+1}>}}, \text{ and}$$

$$y+=y_i+\frac{a(y_{i+1}-y_i)}{D_{<O_i,O_{i+1}>}}+h*\frac{(x_{i+1}-x_i)}{D_{<O_i,O_{i+1}>}},$$

where a and h are given by:

$$a=\frac{(r_i^j)^2-(r_{i+1}^j)^2}{2D_{<O_i,O_{i+1}>}} \text{ and } h=\sqrt{(r_{i+1}^j)^2-a^2},$$

respectively.

In this embodiment, the ECU 30 further comprises a clustering module 34 arranged to cluster the points of intersections. In one example, the clustering module 34 deploys or implements a density-based spatial clustering (DBSCAN) algorithm to perform computations of certain parameters. Such DBSCAN algorithm may be implemented for calculations of:

$$\epsilon = P*\frac{\sum_{i=1}^n (\hat{R}_i)}{n} \text{ and } Min(P)=m^2+1.$$

As shown, $\epsilon$ is the distance threshold between each point, P is a distance ratio threshold, n is a number of sensors, $R_i^{\hat{}}$ is an average distance value of the aligned data from the UWB anchors, Min(P) is the minimum points threshold, and m a number of signals from the UWB anchors to define at least one cluster of points of the UWB anchors.

Additionally, the clustering module 34 is arranged to calculate a clustering quality and a clustering variance of each of the at least one cluster. In one example, the DBSCAN algorithm may be implemented to perform computations of certain performance indicators. That is, the DBSCAN algorithm may be implemented for calculations of:

$$\rho=\frac{1}{e^{\left|N_c-\frac{N_p}{2}\right|}} \text{ and } \delta=\sqrt{\frac{\sum_{i=0}^n p_i-o_c}{n}},$$

where $\rho$ is the clustering quality, e is error between a number of points in the at least one cluster, $N_c$ is a number of points in the at least one cluster, $\delta$ is the clustering variance, $p_i$ is points of the at least one cluster, $o_c$ is a geometric center of each cluster.

Furthermore, the clustering module 34 is further arranged to determine a geometric center of the at least one cluster by way of:

$$o_c = \frac{\sum_{i=0}^{n} p_i}{n}.$$

As provided, $o_c$ is the geometric center of the at least one cluster, $p_i$ is a point of the at least one cluster, and n is a number of intersections of the at least one cluster to define a sensed location of the tag for each cluster.

In this embodiment, the ECU 30 further comprises a Bayesian Module 36 arranged to determine a real-time location of the tag 14 based on a Bayesian probability function to match the sensed location with a predicted location of the tag by way of:

$$L_t = p * (f_C(L_t^s)) + (1-p) * f_{mov}(L_{t-1}, v, \theta)$$

and $$p = \rho \left(1 - \frac{(\arctan(\delta))}{\pi/2}\right).$$

As provided, $L_t$ is the real-time location at timestamp t, p is a normalized location parameter, $f_{bay}$ is the Bayesian probability function, $L_t^s$ is the sensed location for each cluster at timestamp t, $L_t^p$ is the predicted location, v is tag moving speed, $\theta$ is tag moving direction, $\rho$ is cluster quality of the at least one cluster, and $\delta$ is cluster variance of the at least one cluster.

To determine the real-time location of the tag 14, the Bayesian Module 36 is arranged to calculate a sensed probability of each sensed location for each cluster by way of:

$$P_t^{S_i} = \frac{N_{c_i}}{\sum_{j=1}^{S}(N_{c_j})}.$$

It is understood that $P_t^{S_i}$ is the sensed probability, $N_{ci}$ is a number of points in one of the clusters, and $N_{cj}$ is a point in the one of the clusters. Moreover, the Bayesian Module 36 is arranged to compare each sensed location with a predicted location of the tag to identify error by way of:

$$E = \sum_{j=1}^{n}(e_t^{s_j}).$$

As provided, the predicted location is based on the aligned data of the UWB anchors, the E is total error for each cluster and $e_t^{sj}$ is error between the sensed location $L_t^s$ and the predicted location $L_t^p$. Furthermore, the Bayesian Module 36 is arranged to rank each sensed location based on one of highest sensed probability and least amount of error (between the sensed location and the predicted location) to define a real-time location of the tag 14. In turn, results of the highest sensed probability and the least amount of error factor out noise caused by an outdoor environment. That is, noise data caused by the outdoor environment are excluded or minimized when determining the real-time location of the UWB tag 14, thereby improving localization accuracy of UWB technology.

Figure 2:
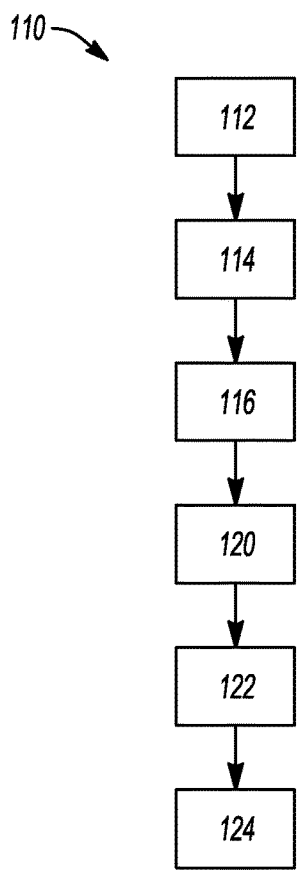
FIG. 2 is a flowchart of a method of ultra wide band (UWB) target localization for a vehicle in accordance with one example of the present disclosure.

FIG. 2 depicts a flowchart for a method 110 of locating an ultrawide band (UWB) tag for a vehicle in accordance with one example of the present disclosure. In this example, the system 10 of FIG. 1 implements steps of the method 110 discussed in greater detail below. Moreover, it is to be understood that the ECU 30 of system 10 may comprise a number of modules (see above) arranged to run algorithms and formulas to calculate, compute, and determine values to assist in achieving the steps of the method 110.

As shown in block 112, the method 110 comprises receiving sensor signals from at least three UWB anchors and a UWB tag for a time period. As in the system 10, the sensor signals 20'-23' represent anchor coordinates and real-time distances between the tag and each anchor.

In block 114, the method 110 further comprises aligning the sensor signals 20'-23' at an aligned timestamp during the time period by way of:

$$t_{s_i} + \frac{k}{f_i} = t_i \text{ when } t_{i-1} \leq t_{s_i} + \frac{k}{fi} < t_i.$$

As provided, $t_{si}$ is an initial timestamp of the time period, k is a number of timestamps of the time period, $f_i$ is a fixed data uploading frequency, $t_i$ is the aligned timestamp, and $t_{si}+k/f_i$ is at an upper limit thereof to define aligned data.

As provided in block 116, the method 110 further comprises determining intersections of the aligned data based on the anchor coordinates and the real-time distances by way of:

$$N_p = \sum_{k=0}^{k=C_N^2} NoI_k.$$

As provided, $N_p$ is total number of intersections, k is an iteration, $C_N^2 = N*(N-1)/2$ is an overall number of groups among N circles, and $NoI_k$ is a number of intersections between a pair of non-concentric circles of the aligned data to define points of intersections.

For example, the step of determining intersections of the aligned data comprises determining a pair of circles defined by the aligned data of the anchors 20-23. Each circle has coordinates with respect to a current distance $r_i^j$ from the tag defined by:

cir$_i^j$: $(X-x_i)^2+(Y-y_i)^2=(r_i^j)^2$. It is understood that each anchor has coordinates defined by: $C_i=(x_i, y_i)$, the aligned data being denoted as: $R_i=r_i^1, r_i^2, \ldots r_i^{mi}$. It is understood that cir$_i^j$ is a circle of an anchor i for an aligned signal j, X is a coordinate of the circle on an x-axis, $x_i$ is a coordinate of the center of the circle on the x-axis, Y is a coordinate of the circle on the y-axis, and $y_i$ is a coordinate of the center of the circle on the y-axis, $R_i$ is a sequence of ranging signals from each anchor, $r_i^j$ is the $j^{th}$ signal of the aligned data of the anchors and represents the current distance.

Moreover, the step of determining intersections of the aligned data further comprises determining a distance between the pair of circles with: $D_{<O_i,O_{i'}>} = \sqrt{(x_i-x_{i'})^2+(y_i-y_{i'})^2}$, where D is a distance between the pair of circles $O_i$ and $O_{i'}$, and determining a number of intersections between the pair of circles with:

$$NoI_{<O_i^j,O_{i'}^{j'}>} = \begin{cases} 0 & D_{<O_i,O_{i'}>} > r_i^j + r_{i'}^{j'} \\ 1 & D_{<O_i,O_{i'}>} = r_i^j + r_{i'}^{j'} \\ 2 & D_{<O_i,O_{i'}>} < r_i^j + r_{i'}^{j'} \end{cases}$$

where NoI is a number of intersections between the pair of circles.

In this example, the step of determining intersections of the aligned data further comprises determining intersection coordinates of the pair of circles with: $P^+_{<i,i+1>}$=(x+,y+) and $P^-_{<i,i+1>}$=(x−,y−). It is understood that $P^+_{<i,i+1>}$ and $P^-_{<i,i+1>}$ are two symmetrical intersections coordinate of circle $O_i^j$ and circle $O_i^{j'}$.

To determine intersection coordinates of the pair of circles, the preprocessing module 32 may compute by way of:

$$x += x_i + \frac{a(x_{i+1} - x_i)}{D_{<O_i,O_{i+1}>}} + h * \frac{(y_{i+1} - y_i)}{D_{<O_i,O_{i+1}>}},$$

$$y += y_i + \frac{a(y_{i+1} - y_i)}{D_{<O_i,O_{i+1}>}} - h * \frac{(x_{i+1} - x_i)}{D_{<O_i,O_{i+1}>}},$$

$$x -= x_i + \frac{a(x_{i+1} - x_i)}{D_{<O_i,O_{i+1}>}} - h * \frac{(y_{i+1} - y_i)}{D_{<O_i,O_{i+1}>}}, \text{ and}$$

$$y -= y_i + \frac{a(y_{i+1} - y_i)}{D_{<O_i,O_{i+1}>}} + h * \frac{(x_{i+1} - x_i)}{D_{<O_i,O_{i+1}>}},$$

where a and h are given by:

$$a = \frac{(r_i^j)^2 - (r_{i+1}^j)^2}{2D_{<O_i,O_{i+1}>}} \text{ and } h = \sqrt{(r_{i+1}^j)^2 - a^2},$$

respectively.

In block 120, the method 110 further comprises clustering the points of intersections by way of:

$$\epsilon = P * \frac{\sum_{i=1}^{n}(\hat{R}_i)}{n} \text{ and Min}(P) = m^2 + 1.$$

As shown, ϵ is the distance threshold between each point, P is a distance ratio threshold, n is a number of sensors, and $R_i^\wedge$ is an average distance value of the aligned data from the UWB anchors, Min(P) is the minimum points threshold, and m is a number of signals from the UWB anchors to define at least one cluster of points of the UWB anchors 20-23.

For example, clustering the points of intersections may comprise calculating a clustering quality and a clustering variance of each of the at least one cluster by way of:

$$\rho = \frac{1}{e^{\left|N_c - \frac{N_p}{2}\right|}} \text{ and } \delta = \sqrt{\frac{\sum_{i=0}^{n} p_i - o_c}{n}},$$

where ρ is the clustering quality, e is error between a number of points in the at least one cluster, $N_c$ is a number of points in the at least one cluster, δ is the clustering variance, $p_i$ is points of the at least one cluster, and $o_c$ is a geometric center of each cluster.

Moreover, in block 122, the method 110 further comprises determining a geometric center of the at least one cluster by way of:

$$o_c = \frac{\sum_{i=0}^{n} p_i}{n}.$$

As provided, $o_c$ is the geometric center of the at least one cluster, $p_i$ is a point of the at least one cluster, and n is a number of intersections of the at least one cluster to define a sensed location of the tag for each cluster.

Furthermore in block 124, the method 110 further comprises determining a real-time location of the tag 14 based on a Bayesian probability function to match the sensed location with a predicted location of the tag 14 by way of:

$$L_t = p * f_{bay}(L_t^s, L_t^p) + (1 - p) * L_t^p,$$

$$L_t^p = f_{mov}(L_{t-1}, v, \theta), \text{ and}$$

$$p = \rho * \left(1 - \frac{\arctan(\delta)}{\pi/2}\right).$$

As shown, $L_t$ is the real-time location at timestamp t, p is a normalized location parameter, $f_{bay}$ is the Bayesian probability function, $L_t^s$ is the sensed location for each cluster at timestamp t, $L_t^p$ is the predicted location, $f_{mov}$ is a moving function for the motion-based predicted location, v is tag moving speed, θ is tag moving direction, ρ is cluster quality of the at least one cluster, and δ is cluster variance of the at least one cluster.

For example, the step determining the real-time location of the tag 14 may comprises calculating a sensed probability of each sensed location for each cluster by way of:

$$P_t^{S_i} = \frac{N_{ci}}{\sum_{j=1}^{s}(N_{cj})}.$$

As shown, $P_t^{S_i}$ is the sensed probability, $N_{ci}$ is a number of points in one of the clusters, and $N_{cj}$ is a point in the one of the clusters. Moreover, the step of determining the real-time location of the tag may further comprise comparing each sensed location with a predicted location of the tag 14 to identify error by way of:

$$E = \sum_{j=1}^{n}(e_t^{s_j}).$$

It is understood that the predicted location is based on the aligned data of the UWB anchors 20-23, the E is total error for each cluster and $e_t^{sj}$ is error between the sensed location $L_t^s$ and the predicted location $L_t^p$. Furthermore, the step of determining the real-time location of the tag 14 may further comprise ranking each sensed location based on one of highest sensed probability and least amount of error between the sensed location and the predicted location to define a real-time location of the tag 14.

In turn, results of the highest sensed probability and the least amount of error factor out noise caused by an outdoor environment. That is, noise data caused by the outdoor environment are excluded or minimized in determining the real-time location of the UWB tag 14, thereby improving localization accuracy of UWB technology.

Figure 3:
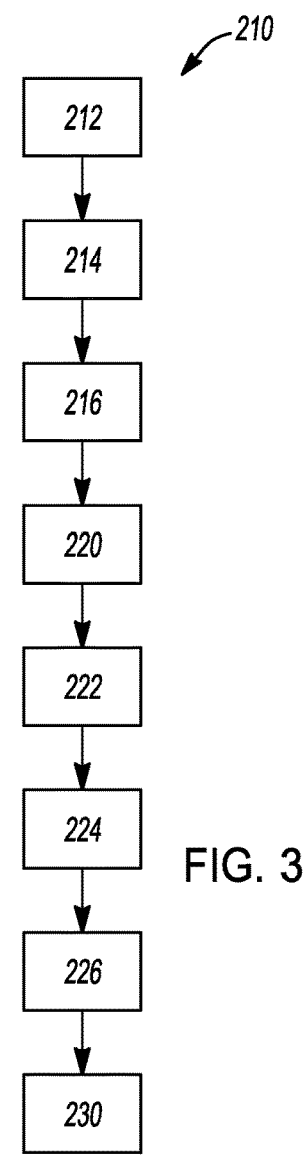
FIG. 3 is a flowchart of a method of locating a UWB tag for a vehicle in accordance with another example of the present disclosure.

FIG. 3 illustrates a flowchart of a method 210 of locating a UWB tag for a vehicle in accordance with another example of the present disclosure. In this example, the system 10 of FIG. 1 implements steps of the method 210 discussed in greater detail below. Moreover, it is to be understood that the ECU 30 of system 10 may comprise a number of modules (see above) arranged to run algorithms and formulas to calculate, compute, and determine values to assist in achieving the steps of the method 210.

As shown in block 212, the method 210 comprises receiving sensor signals 20'-23' from at least three UWB anchors and a tag for a time period. As mentioned, the sensor signals 20'-23' represent anchor coordinates and real-time distances between the tag and each anchor.

In block 214, the method 210 further comprises aligning the sensor signals 20'-23' at an aligned timestamp during the time period by way of:

$$\overline{t_{s_i} + \frac{k}{f_i}} = t_i \text{ when } t_{i-1} \leq t_{s_i} + \frac{k}{f_i} < t_i.$$

It is understood that $t_{s_i}$ is an initial timestamp of the time period, k is a number of timestamps of the time period, $f_i$ is a fixed data uploading frequency, $t_i$ is the aligned timestamp, and $t_{si}+k/f_i$ is at an upper limit thereof to define aligned data.

In block 216, the method 210 further comprises determining intersections of the aligned data based on the anchor coordinates and the real-time distances by way of:

$$N_p = \sum_{k=0}^{k=C_N^2} NoI_k.$$

As provided, $N_p$ is total number of intersections, k is an iteration, $C_N^2=N*(N-1)/2$ is an overall number of groups among N circles, and $NoI_k$ is a number of intersections between a pair of non-concentric circles of the aligned data to define points of intersections.

In block 220, the method 210 further comprises a step of clustering the points of intersections by way of:

$$\epsilon = P * \frac{\sum_{i=1}^{n}(\hat{R}_i)}{n} \text{ and } \text{Min}(P) = m^2 + 1.$$

As shown, $\epsilon$ is the distance threshold between each point, P is a distance ratio threshold, n is a number of sensors, and $\hat{R}_i$ is an average distance value of the aligned data from the UWB anchors, Min(P) is the minimum points threshold, and m is a number of signals from the UWB anchors 20-23 to define at least one cluster of points of the UWB anchors 20-23. In one example, the step of clustering the points of intersections comprises calculating a clustering quality and a clustering variance of each of the at least one cluster by way of:

$$\rho = \frac{1}{e^{\left|N_c - \frac{N_p}{2}\right|}} \text{ and } \delta = \sqrt{\frac{\sum_{i=0}^{n} p_i - o_c}{n}}.$$

As provided, ρ is the clustering quality, e is error between a number of points in the at least one cluster, $N_c$ is a number of points in the at least one cluster, δ is the clustering variance, $p_i$ is points of the at least one cluster, $o_c$ is a geometric center of each cluster.

In block 222, the method 210 further comprises determining a geometric center of the at least one cluster by way of:

$$o_c = \frac{\sum_{i=0}^{n} p_i}{n}.$$

It is understood that $o_c$ is the geometric center of the at least one cluster, $p_i$ is a point of the at least one cluster, and n is a number of intersections of the at least one cluster to define a sensed location of the tag 14 for each cluster.

Moreover, in block 224, the method 210 further comprises calculating a sensed probability of each sensed location for each cluster with a Bayesian probability function of:

$$P_t^{s_i} = \frac{N_{ci}}{\sum_{j=1}^{s}(N_{cj})}.$$

It is understood that $P_t^{S_i}$ is the sensed probability, $N_{ci}$ is a number of points in one of the clusters, $N_{cj}$ is a point in the one of the clusters. Here, the sensed probability $P_t^{S_i}$ is updated based on ranking each sensed location which in turn is based on least amount of error between the sensed location and the predicted location.

Additionally, in block 226, the method 210 comprises comparing each sensed location with a predicted location of the tag 14 to identify error by way of:

$$E = \sum_{j=1}^{n} (e_t^{sj}).$$

As provided, the predicted location is based on the aligned data of the UWB anchors, the E is total error for each cluster and $e_t^{sj}$ is error between the sensed location $L_t^s$ and the predicted location $L_t^p$.

Furthermore, in block 230, the method 210 comprises ranking each sensed location based on one of highest sensed probability and least amount of error between the sensed location and the predicted location to define a real-time location of the tag 14. In this example, the real-time location of the tag 14 is based on the Bayesian probability function to compare the sensed location with the predicted location of the tag 14. Here, the real-time location is defined by $$L_t = p * f_{bay}(L_t^s, L_t^p) + (1-p) * L_t^p$$

$$L_t^p = fmov(L_{t-1}, v, \theta), \text{ and}$$

$$p = \rho * \left(1 - \frac{\arctan(\delta)}{\pi/2}\right).$$

As shown, $L_t$ is the real-time location at timestamp t, p is a normalized location parameter, $f_{bay}$ is the Bayesian probability function, $L_t^s$ is the sensed location for each cluster at timestamp t, $L_t^p$ is the predicted location, $f_{mov}$ is a moving function for the motion-based predicted location, v is tag moving speed, θ is tag moving direction, ρ is cluster quality of the at least one cluster, and δ is cluster variance of the at least one cluster.

In turn, results of the highest sensed probability and the least amount of error factor out noise caused by an outdoor environment. That is, noise data caused by the outdoor environment is not considered in determining the real-time location of the UWB tag 14, thereby improving localization accuracy of UWB technology.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of resilient ultra wide band (UWB) target localization for a vehicle, the method comprising:
    receiving sensor signals from at least three UWB anchors and a UWB tag for a time period, the sensor signals representing anchor coordinates and real-time distances between the tag and each anchor;
    aligning the sensor signals at an aligned timestamp during the time period by way of:

$$\overline{t_{s_i} + \frac{k}{f_i}} = t_i \text{ when } t_{i-1} \le t_{s_i} + \frac{k}{f_i} < t_i.$$

where $t_{s_i}$ is an initial timestamp of the time period, k is a number of timestamps of the time period, $f_i$ is a fixed data uploading frequency, $t_i$ is the aligned timestamp, $t_{s_i}+k/f_i$ is at an upper limit to define aligned data;
    determining intersections of the aligned data based on the anchor coordinates and the real-time distances by way of:

$$N_p = \sum_{k=0}^{k=C_N^2} NoI_k$$

where $N_p$ is total number of intersections, k is an iteration, $C_N^2 = N*(N-1)/2$ is an overall number of groups among N circles, and $NoI_k$ is a number of intersections between a pair of non-concentric circles of the aligned data to define points of intersections;
    clustering the points of intersections by way of:

$$\epsilon = P * \frac{\sum_{i=1}^{n}(\hat{R}_i)}{n}$$

and $$\text{Min}(P) = m^2 + 1$$

where ε is a distance threshold between each point, P is a distance ratio threshold, n is a number of sensors, and $\hat{R}_i$ is an average distance value of the aligned data from the UWB anchors, Min(P) is a minimum points threshold, and m is a number of signals from the UWB anchors to define at least one cluster of points of the UWB anchors;
    determining a geometric center of the at least one cluster by way of:

$$o_c = \frac{\sum_{i=0}^{n} p_i}{n}$$

where $o_c$ is the geometric center of the at least one cluster, $p_i$ is a point of the at least one cluster, and n is a number of intersections of the at least one cluster to define a sensed location of the tag for each cluster;
    determining a real-time location of the tag based on a Bayesian probability function to match the sensed location with a predicted location of the tag by way of:

$$L_t = p * f_{bay}(L_t^s, L_t^p) + (1-p) * L_t^p,$$

$$L_t^p = fmov(L_{t-1}, v, \theta), \text{ and}$$

$$p = \rho * \left(1 - \frac{\arctan(\delta)}{\pi/2}\right)$$

where $L_t$ is the real-time location at timestamp t, p is a normalized location parameter, $f_{bay}$ is the Bayesian probability function, $L_t^s$ is the sensed location for each cluster at timestamp t, $L_t^p$ is the predicted location, $f_{mov}$ is a moving function for a motion-based predicted location, v is tag moving speed, θ is tag moving direction, ρ is cluster quality of the at least one cluster, and δ is cluster variance of the at least one cluster.

2. The method of claim 1 wherein determining intersections of the aligned data comprises:
    determining a pair of circles defined by the aligned data of the anchors, each circle having coordinates defined by:

$$cir_i^j: (X-x_i)^2 + (Y-y_i)^2 = (r_i^j)^2,$$

each anchor having coordinates defined by:

$$C_i = (x_i, y_i),$$

the aligned data being denoted as:

$$R_i = r_i^1, r_i^2, \ldots r_i^{mi}$$

where $cir_i^j$ is a circle of an anchor i for an aligned signal j, X is a coordinate of the circle on an x-axis, $x_i$ is a coordinate of the center of the circle on the x-axis, Y is a coordinate of the circle on a y-axis, and $y_i$ is a coordinate of the center of the circle on the y-axis, $R_i$ is a sequence of ranging signals from each anchor, $r_i^j$ is a $j^{th}$ signal of the aligned data of the anchors;
    determining a distance between the pair of circles with:

$$D_{<O_i,O_{i'}>} = \sqrt{(x_i-x_{i'})^2 + (y_i-y_{i'})^2},$$

where D is a distance between the pair of circles $O_i$ and $O_{i'}$;
    determining a number of intersections between the pair of circles with:

$$NoI_{\{O_i^j, O_{i'}^{j'}\}} \begin{cases} 0 & D_{\{O_i,O_{i'}\}} > r_i^j + r_{i'}^{j'} \\ 1 & D_{\{O_i,O_{i'}\}} = r_i^j + r_{i'}^{j'} \\ 2 & D_{\{O_i,O_{i'}\}} < r_i^j + r_{i'}^{j'} \end{cases}$$

where NoI is a number of intersections between the pair of circles.

3. The method of claim 2 wherein determining intersections of the aligned data comprises:

determining intersection coordinates of the pair of circles with:

$$I^+_{<i,i+1>}=(x+,y+) \text{ and } I^-_{<i,i+1>}=(x-,y-),$$

where $I^+_{<i,i+1>}$ and $I^-_{<i,i+1>}$ are two symmetrical intersections coordinate of circle $O_i^j$ and circle $O_i^{j'}$.

4. The method of claim 3 wherein determining intersection coordinates of the pair of circles is by way of:

$$x+ = x_i + \frac{a(x_{i+1} - x_i)}{D_{\langle O_i, O_{i+1}\rangle}} + h * \frac{(y_{i+1} - y_i)}{D_{\langle O_i, O_{i+1}\rangle}},$$

$$y+ = y_i + \frac{a(y_{i+1} - y_i)}{D_{\langle O_i, O_{i+1}\rangle}} - h * \frac{(x_{i+1} - x_i)}{D_{\langle O_i, O_{i+1}\rangle}},$$

$$x- = x_i + \frac{a(x_{i+1} - x_i)}{D_{\langle O_i, O_{i+1}\rangle}} - h * \frac{(y_{i+1} - y_i)}{D_{\langle O_i, O_{i+1}\rangle}},$$

and $$y- = y_i + \frac{a(y_{i+1} - y_i)}{D_{\langle O_i, O_{i+1}\rangle}} + h * \frac{(x_{i+1} - x_i)}{D_{\langle O_i, O_{i+1}\rangle}},$$

where a and h are given by:

$$a = \frac{(r_i^j)^2 - (r_{i+1}^j)^2}{2D_{\langle O_i, O_{i+1}\rangle}} \text{ and}$$

$$h = \sqrt{(r_{i+1}^j)^2 - a^2},$$

respectively.

5. The method of claim 1 wherein clustering the points of intersections comprises calculating a clustering quality and a clustering variance of each of the at least one cluster by way of:

$$\rho = \frac{1}{e^{|N_c - \frac{N_p}{2}|}} \text{ and}$$

$$\delta = \sqrt{\frac{\sum_{i=0}^{n} p_i - o_c}{n}}$$

where ρ is the clustering quality, e is error between a number of points in the at least one cluster, $N_c$ is a number of points in the at least one cluster, δ is the clustering variance, $p_i$ is points of the at least one cluster, $o_c$ is a geometric center of each cluster.

6. The method of claim 1 wherein determining the real-time location of the tag comprises calculating a sensed probability of each sensed location for each cluster by way of:

$$P_t^{s_i} = \frac{N_{c_i}}{\sum_{j=1}^{s}(N_{c_j})}$$

where $P_t^{S_i}$ is the sensed probability, $N_{ci}$ is a number of points in one of the clusters, and $N_{cj}$ is a point in the one of the clusters.

7. The method of claim 6 wherein determining the real-time location of the tag further comprises comparing each sensed location with a predicted location of the tag to identify error by way of:

$$E = \sum_{j=1}^{n}(e_t^{s_j})$$

where the predicted location is based on the aligned data of the UWB anchors, the E is total error for each cluster and $e_t^{sj}$ is error between the sensed location $L_t^s$ and the predicted location $L_t^p$.

8. The method of claim 7 wherein determining the real-time location of the tag further comprises ranking each sensed location based on one of highest sensed probability and least amount of error between the sensed location and the predicted location to define a real-time location of the tag.

9. A system of resilient UWB target localization for a vehicle, the system comprising:
a UWB tag arranged to be mobile and trackable by way of a sensor signal;
at least three UWB anchors, each UWB anchor being in communication with the UWB tag and arranged to receive and send the sensor signal for tracking the UWB tag;
a gateway in communication with the UWB anchor, the gateway comprising an electronic control unit (ECU) arranged to receive sensor signals from at the UWB anchors for a time period, the sensor signals representing anchor coordinates and real-time distances between the tag and each anchor, the ECU comprising:
a preprocessing module arranged to align the sensor signals at an aligned timestamp during the time period by way of:

$$\overline{t_{s_i} + \frac{k}{f_i}} = t_i \text{ when } t_{i-1} \leq t_{s_i} + \frac{k}{f_i} < t_i$$

where $t_{si}$ is an initial timestamp of the time period, k is a number of timestamps of the time period, $f_i$ is a fixed data uploading frequency, $t_i$ is the aligned timestamp, $t_{si}+k/f_i$ is at an upper limit to define aligned data, the preprocessing module arranged to determine intersections of the aligned data based on the anchor coordinates and the real-time distances by way of:

$$N_p = \sum_{k=0}^{k=C_N^2} NoI_k$$

where $N_p$ is total number of intersections, k is an iteration, $C_N^2 = N*(N-1)/2$ is an overall number of groups among N circles, and $NoI_k$ is a number of intersections between a pair of non-concentric circles of the aligned data to define points of intersections,
a clustering module arranged to cluster the points of intersections by way of:

$$\epsilon = P * \frac{\sum_{i=1}^{n}(\hat{R}_i)}{n} \text{ and } \text{Min}(P) = m^2 + 1$$

where ϵ is a distance threshold between each point, P is a distance ratio threshold, n is a number of sensors, and $R_i\hat{}$ is an average distance value of the aligned data from the UWB anchors, Min(P) is a minimum points threshold, and m is a number of signals from the UWB anchors to define at least one cluster of points of the UWB anchors, the clustering module further arranged to determine a geometric center of the at least one cluster by way of:

$$o_c = \frac{\sum_{i=1}^{n} p_i}{n}$$

where $o_c$ is the geometric center of the at least one cluster, $p_i$ is a point of the at least one cluster, and n is a number of intersections of the at least one cluster to define a sensed location of the tag for each cluster;

a Bayesian module arranged to determine a real-time location of the tag based on a Bayesian probability function to match the sensed location with a predicted location of the tag by way of:

$$[[L_t = p*(f_c(L_t^s) + (1-p)*f_{mov}(L_{t-1}, v, \theta))]]$$

$$L_t = p * f_{bay}(L_t^s, L_t^p) + (1 - p) * L_t^p,$$

$$L_t^p = fmov(L_{t-1}, v, \theta), \text{ and}$$

$$p = \rho * \left(1 - \frac{\arctan(\delta)}{\pi/2}\right)$$

where $L_t$ is the real-time location at timestamp t, p is a normalized location parameter, $f_{bay}$ is the Bayesian probability function, $L_t^s$ is the sensed location for each cluster at timestamp t, $L_t^p$ is the predicted location, $f_{mov}$ is a moving function for the motion-based predicted location, v is tag moving speed, $\theta$ is tag moving direction, $\rho$ is cluster quality of the at least one cluster, and $\delta$ is cluster variance of the at least one cluster.

10. The system of claim 9 wherein preprocessing module is arranged to determine intersections of the aligned data comprises:

the preprocessing module being arranged to determine a pair of circles defined by the aligned data of the anchors, each circle having coordinates defined by:

$$cir_i^j: (X-x_i)^2 + (Y-y_i)^2 = (r_i^j)^2,$$

each anchor having coordinates defined by:

$$C_i = (x_i, y_i),$$

the aligned data being denoted as:

$$R_i = r_i^1, r_i^2, \ldots r_i^{mi}$$

where $cir_i^j$ is a circle of an anchor i for an aligned signal j, X is a coordinate of the circle on an x-axis, $x_i$ is a coordinate of the center of the circle on the x-axis, Y is a coordinate of the circle on a y-axis, and $y_i$ is a coordinate of the center of the circle on the y-axis, $R_i$ is a sequence of ranging signals from each anchor, $r_i^j$ is a $j^{th}$ signal of the aligned data of the anchors;

the preprocessing module being arranged to determine a distance between the pair of circles with:

$$D_{\langle O_i, O_{i'} \rangle} = \sqrt{(x_i - x_i)^2 + (y_i - y_i)^2},$$

where D is a Euclidian distance between the pair of circles $O_i$ and $O_i'$;

the preprocessing module being arranged to determine a number of intersections between the pair of circles with:

$$NoI_{\langle O_i^j, O_{i'}^{j'} \rangle} = \begin{cases} 0 & D_{\langle O_i, O_{i'} \rangle} > r_i^j + r_{i'}^{j'} \\ 1 & D_{\langle O_i, O_{i'} \rangle} = r_i^j + r_{i'}^{j'} \\ 2 & D_{\langle O_i, O_{i'} \rangle} < r_i^j + r_{i'}^{j'} \end{cases}$$

where NoI is a number of intersections between the pair of circles.

11. The system of claim 10 wherein the preprocessing module is arranged to determine intersections of the aligned data further comprises:

the preprocessing module being arranged to determine intersection coordinates of the pair of circles with:

$$P^+_{\langle i, i+1 \rangle} = (x+, y+) \text{ and } P^-_{\langle i, i+1 \rangle} = (x-, y-),$$

where $P^+_{\langle i, i+1 \rangle}$ and $P^-_{\langle i, i+1 \rangle}$ are two symmetrical intersections coordinate of circle $O_i^j$ and circle $O_{i'}^{j'}$.

12. The system of claim 11 wherein the preprocessing module being arranged to determine intersection coordinates of the pair of circles is by way of:

$$x+ = x_i + \frac{a(x_{i+1} - x_i)}{D_{\langle O_i, O_{i+1} \rangle}} + h * \frac{(y_{i+1} - y_i)}{D_{\langle O_i, O_{i+1} \rangle}},$$

$$y+ = y_i + \frac{a(y_{i+1} - y_i)}{D_{\langle O_i, O_{i+1} \rangle}} - h * \frac{(x_{i+1} - x_i)}{D_{\langle O_i, O_{i+1} \rangle}},$$

$$x- = x_i + \frac{a(x_{i+1} - x_i)}{D_{\langle O_i, O_{i+1} \rangle}} - h * \frac{(y_{i+1} - y_i)}{D_{\langle O_i, O_{i+1} \rangle}}, \text{ and}$$

$$y- + = y_i + \frac{a(y_{i+1} - y_i)}{D_{\langle O_i, O_{i+1} \rangle}} + h * \frac{(x_{i+1} - x_i)}{D_{\langle O_i, O_{i+1} \rangle}},$$

where a and h are given by:

$$a = \frac{(r_i^j)^2 - (r_{i+1}^j)^2}{2 D_{\langle O_i, O_{i+1} \rangle}} \text{ and}$$

$$h = \sqrt{(r_{i+1}^j)^2 - a^2},$$

respectively.

13. The system of claim 9 wherein the clustering module is arranged to cluster the points of intersections comprises the clustering module being arranged to calculate a clustering quality and a clustering variance of each of the at least one cluster by way of:

$$\rho = \frac{1}{e^{|N_c - \frac{N_p}{2}|}} \text{ and}$$

$$\delta = \sqrt{\frac{\sum_{i=0}^{n} p_i - o_c}{n}}$$

where $\rho$ is the clustering quality, e is error between a number of points in the at least one cluster, $N_c$ is a number of points in the at least one cluster, $\delta$ is the clustering variance, $p_i$ is points of the at least one cluster, $o_c$ is a geometric center of each cluster.

14. The system of claim 9 wherein the Bayesian module is arranged to determine the real-time location of the tag comprises the Bayesian module being arranged to calculate a sensed probability of each sensed location for each cluster by way of:

$$P_t^{s_i} = \frac{N_{c_i}}{\sum_{j=1}^{s}(N_{c_j})}$$

where $P_t^{S_i}$ is the sensed probability, $N_{ci}$ is a number of points in one of the clusters, and $N_{cj}$ is a point in the one of the clusters.

15. The system of claim 14 wherein the Bayesian module is arranged to determine the real-time location of the tag further comprises the Bayesian module being arranged to compare each sensed location with a predicted location of the tag to identify error by way of:

$$E = \sum_{j=1}^{n}\left(e_t^{s_i}\right)$$

where the predicted location is based on the aligned data of the UWB anchors, the E is total error for each cluster and $e_t^{sj}$ is error between the sensed location $L_t^s$ and the predicted location $L_t^p$.

16. The system of claim 15 wherein the Bayesian module is arranged to determine the real-time location of the tag further comprises the Bayesian module being arranged to rank each sensed location based on least amount of error between the sensed location and the predicted location to define the real-time location of the tag.

17. A method of locating an ultrawide band (UWB) tag for a vehicle, the method comprising:
receiving sensor signals from at least three UWB anchors and the UWB tag for a time period, the sensor signals representing anchor coordinates and real-time distances between the tag and each anchor;
aligning the sensor signals at an aligned timestamp during the time period to define aligned data;
determining intersections of the aligned data based on the anchor coordinates and the real-time distances to define points of intersections;
clustering the points of intersections to define at least one cluster of points of the UWB anchors;
determining a geometric center of the at least one cluster to define a sensed location of the tag for each cluster;
calculating a sensed probability of each sensed location for each cluster with a Bayesian probability;
comparing each sensed location with a predicted location of the tag to identify error; and
ranking each sensed location based on one of highest sensed probability and least amount of error between the sensed location and the predicted location to define a real-time location of the tag.

18. The method of claim 17 wherein the real-time location of the tag is based on the Bayesian probability to compare the sensed location with the predicted location of the tag.

19. The method of claim 18 wherein clustering the points of intersections comprises calculating a clustering quality and a clustering variance of each of the at least one cluster.

20. The method of claim 17 wherein the sensed probability is updated based on ranking each sensed location based on least amount of error between the sensed location and the predicted location.

* * * * *